Patented Dec. 28, 1943

2,337,964

UNITED STATES PATENT OFFICE 2,337,964

DIRECTION FINDER

Edward D. Blodgett, Haddonfield, N. J., assignor to Radio Corporation of America, a corporation of Delaware Application July 31, 1942, Serial No. 452,986

4 Claims. (Cl. 250—11)

This invention relates to radio direction finders, and more particularly to sense determination in a multiband system using orthogonal loops. The 180° ambiguity of bearing indication, resulting from the figure of eight pattern of loop directivity, is resolved by rotating the loop 90° from its null position and comparing the loop output in the new position with the output of a nondirective antenna. One loop is used for low frequency operation, and the other for high frequency operation. The loops are supported at right angles to each other on a rotatable shaft which is provided with an azimuth scale for each loop. The two azimuth scales are displaced from each other by 90°, and it is proposed to take advantage of this relationship to eliminate the mental arithmetic of adding 90° to the bearing indication for sense determination.

Accordingly, it is an object of this invention to provide an improved method of and means for sense determination in radio direction finders using orthogonal loops.

Another object is to provide an improved multiband direction finder arranged to expose automatically the proper azimuth scale and thus minimize confusion of the operator.

A further object is to provide an improved radio direction finder which eliminates the necessity for mental addition in the operation of sense determination with the attendant possibility of error.

These and other and incidental objects will become apparent to those skilled in the art upon consideration of the following description, with reference to the accompanying drawing, which is a partial schematic diagram of a direction finder embodying the invention.

A pair of loops 1 and 3 are supported at right angles to each other on a shaft schematically indicated by the dashed line 5. The loops are enclosed by a streamlined housing 7, which may be supported by means of a base 9 on the outer surface of an airplane or other craft. A narrow oblong opening 11 is provided at the bottom of the housing 7. The loops 1 and 3 are of such diameters that the inner loop may be rotated about the axis of the shaft 5 with respect to the outer loop so that the two lie in a common plane. When disposed in this relation, both loops may be inserted through the opening 11, and spread apart to the desired angle by means of a tool, such as a screwdriver, introduced through the opening. The loops are then locked to the shaft 5.

A pair of cylindrical azimuth scales 13 and 15 are provided near the lower end of the shaft 5, and arranged to rotate therewith. A crank 17 is connected to the shaft 5 by gearing 19. The scales 13 and 15 are displaced with respect to each other by 90°, to conform with the positions of the corresponding loops 1 and 3.

A shutter 21 is supported on a pair of levers 22 geared to the shaft 23 of a torque motor 25, so that when the motor 25 is not energized, the shutter 21 is drawn to its lower position, shown in solid lines by a spring 26, and when the motor is energized, the shutter is moved to its upper position, shown in dotted lines. The shutter 21 covers one or the other of the scales 13 and 15, depending on whether or not the motor 25 is energized.

The loops 1 and 3 are connected through a cable schematically indicated by the dashed line 27 to a radio receiver 29, which is provided with a tuning control 31, a frequency band switch 33, and an antenna selector switch 35. A non-directional antenna 37 is also connected to the receiver 29. The switch 35 connects only the loop circuit to the receiver when in the position marked "bilateral," and connects both non-directive antenna and the loop circuit, when on the position marked "unilateral." The output of the receiver is supplied to a transducer, such as a pair of headphones 39. The circuit details of the receiver 29 form no part of this invention and hence will not be described.

A pair of single pole double throw switches 41 and 43 are connected between the motor 25 and a power source such as a battery 45. The circuit is arranged so that the motor 25 may be energized or deenergized at either switch. The switch 41 is mechanically connected to the band switch 33, so as to be operated to one position, for example, the upper, when the band switch is on one of the higher frequency positions, and to the other position when the band switch is on one of the lower frequency positions. The switch 43 is similarly connected to the selector switch 35, so that when the selector is on the unilateral position, one contact is closed, and when the selector is on the bilateral position, the other contact is closed. A resistor 44 is connected in series with the motor 25 and a switch 46 is connected across the resistor. The switch 46 is arranged to be opened by the motor 25 when the motor reaches its energized limit of travel. This inserts the resistor 44 to reduce the motor current.

The operation of the system is as follows: The switch 35 is turned to the bilateral position and Dec. 28, 1943.  W. S. GORTON  2,338,036
CATHODE RAY DEVICE
Filed Aug. 8, 1941
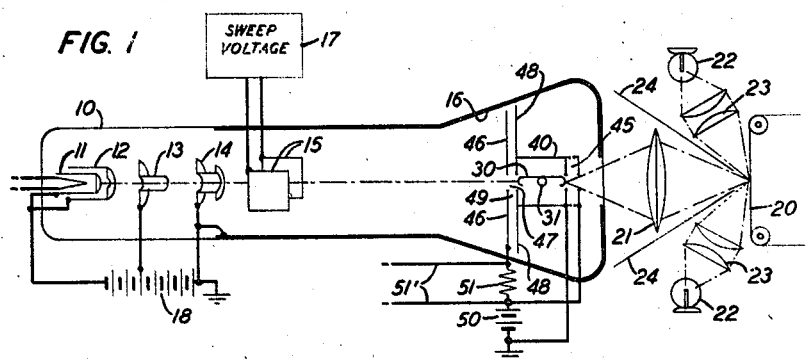
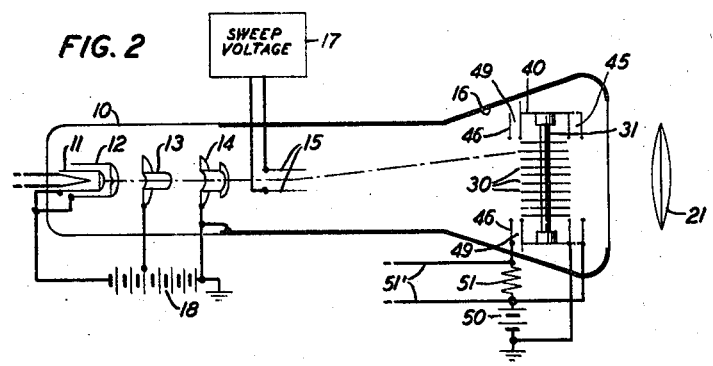
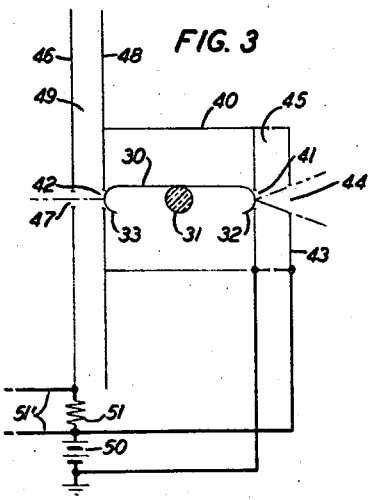
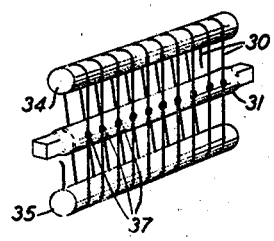
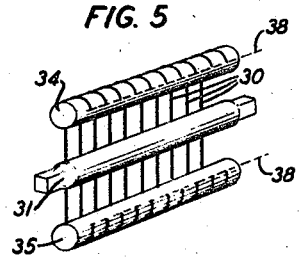
INVENTOR
W. S. GORTON
BY
ATTORNEY